United States Patent Office 3,312,631
Patented Apr. 4, 1967

3,312,631
METHOD FOR MAKING METAL OXIDE MICROSPHERES
Jean G. Smith, Baltimore, Md., assignor to W. R. Grace & Co., New York, N.Y., a corporation of Connecticut
No Drawing. Filed Apr. 15, 1965, Ser. No. 448,260
5 Claims. (Cl. 252—301.1)

This invention relates to a process for producing highly uniform metal oxide microspheres.

In summary, the process of this invention is a method for forming microspheres from metal oxides comprising mixing an ammonia-releasing agent with an aqueous solution containing salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof, and containing from 0 to 5 moles of colloidal carbon per mole of metal; introducing the mixture in the form of droplets into a dehydrating solvent having a temperature sufficiently high to cause substantial ammonia release from the ammonia-releasing agent; and recovering dehydrated microspheres from the dehydrating solvent.

In the process of this invention, as described above, the preferred ammonia-releasing agents are selected from the group consisting of hexamethylenetetramine, acetamide, ammonium carbamate, ammonium cyanate, urea and mixtures thereof. The metal salts are present in the solution in any concentration up to that required to provide a saturated solution. Preferably, the ammonia-releasing agent is mixed with the solution in a quantity sufficient to provide from about 70 to 300 percent of the stoichiometric quantity of ammonia required to react with the salt dissolved in the solution, i.e., from 70 percent of the stoichiometric quantity required up to 200 percent in excess thereof.

Dense microspheres of actinide oxides alone or in combination with other metal oxides and/or carbon, in the size range of from 50 to 200 microns are important for manufacturing fuel elements for high temperature nuclear reactors of which the gas-cooled reactors are an example. Each microsphere consists of two parts, a core and a coating. The core is the portion containing the actinide oxide, either alone or in solid solution with another oxide. As an alternative material, the core can be an actinide carbide which is formed from actinide oxide and carbon mixtures. The core must have good sphericity, strength, and high density. An impervious coating of a refractory metal oxide or pyrolytic carbon is applied to the core to insure fission product retention. The coated microspheres are then dispersed in a matrix material and fabricated into fuel elements.

It is one object of this invention to make microsphere cores by a simple, direct process.

It is another object of this invention to make microsphere cores containing metal oxides selected from the group consisting of uranium dioxide, uranium trioxide, thorium dioxide, plutonium dioxide, plutonium trioxide, zirconium dioxide, beryllium oxide, yttrium oxide, and mixtures thereof, either alone or in combination with carbon, from which dense microspheres of the metal oxides or metal carbides can be prepared.

The metal compounds which are desirable in nuclear reactor fuel elements include uranium dioxide, uranium trioxide, thorium dioxide, plutonium dioxide, plutonium trioxide, diluent oxides such as zirconium dioxide, yttrium oxide, and beryllium oxide, and the respective carbides of the metal oxides. In the process of this invention, microspheres containing these oxides are formed by the general technique of mixing an ammonia-releasing agent with an aqueous solution containing salts of the metal cations corresponding to the oxide desired in the microsphere, introducing the mixture in the form of droplets into a dehydrating solvent having a temperature which is sufficiently high to cause substantial ammonia release from the ammonia-releasing agent, and recovering microspheres from the dehydrating solvent which have undergone at least partial dehydration. The metal salts which can be employed in the solution from which the microspheres are obtained are salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof. The anion portion of the salt can be any anion providing a water-soluble salt. Examples of suitable metal salts include the metal chlorides, bromides, nitrates, sulfates, formates, and acetates.

The concentration of the metal salt in the aqueous solution can vary from 1 g./l., expressed as the respective metal oxide, up to the saturation concentration of the solution. Preferably, the concentration should be from about 50 to 150 g./l., expressed as the oxide. By varying the solution concentration and the size of the droplets introduced into the dehydrating solvent, it is possible to obtain microspheres upon dehydration which have a wide range of sizes.

The ammonia-releasing agents employed in the process of this invention are, in general, compounds which when heated above room temperature provide a substantial release of ammonia by thermal decomposition but which are relatively stable at room temperature. Because of their low rate of reaction and ammonia release at room temperature, these compounds can be added to the metal salt solutions at room temperature without causing an immediate reaction. When the solution is heated by contact with the dehydration solvent, these compounds decompose rapidly and precipitate the metal oxides in the droplets. Examples of suitable ammonia-releasing agent are hexamethylenetetramine, acetamide, ammonium carbamate, ammonium cyanate, urea, and mixtures thereof. Mixtures containing hexamethylenetetramine and urea are particularly suitable, since the urea acts to accelerate ammonia release from thermal decomposition of hexamethylenetetramine. The amount of ammonia-releasing agent which is incorporated into the metal salt solution can be a quantity sufficient to provide from about 70% of stoichiometric quantity of ammonia required to precipitate the metal salt up to 200% of an excess of the stoichiometric quantity. The preferred amount of ammonia releasing agent is from the stoichiometric quantity up to 50 percent in excess thereof. The ammonia-releasing agent may be added as a solid to the metal salt solution or it may first be dissolved in water and then added in a solution form. It is desirable to stir the metal salt solution when the ammonia-releasing agent is added in order to prevent localized concentrations of the ammonia-releasing agent in the metal salt solution and premature precipitation which may result therefrom.

The production of metal carbide microspheres for use in nuclear reactor fuel construction has recently become very important. The process of this invention can be employed to produce microspheres containing an extremely intimate, uniform metal oxide-carbon mixture. The metal oxide-carbon mixture can be obtained by the simple technique of dispersing colloidal carbon in the metal salt solution prior to the introduction thereof into the dehydrating solvent. Fine sized carbons such as Mogul produced by Cabot Corporation are suitable. Carbon dispersion in the metal salt solution can be easily obtained by addition of the carbon to the metal salt solution and dispersion thereof with an ultrasonic probe. Alternatively, the carbon can be dispersed in water with an ultrasonic probe, or high shear mixer, and the carbon suspension can then be added to the metal salt solution. Surfactants can be employed to aid in dispersing the carbon.

The particular technique employed for obtaining the carbon dispersion in the metal salt solution is not critical.

The microspheres are formed from solutions of the metal salts, ammonia-releasing agent, and with or without carbon in suspension using a hot solvent column system such as disclosed in application Ser. No. 364,930 and Ser. No. 364,931 filed May 5, 1964. In this system, the solution or suspension droplets are introduced into the top of a counter-currently flowing stream of hot dehydrating solvent passing up through a tall column. The hot solvents heats the droplets and effects decomposition of the ammonia-releasing agent, and the released ammonia reacts with the metal salt to precipitate the corresponding oxide in the aqueous droplet. As the droplets fall through the column, they are dehydrated, and the dehydrated microspheres are collected from the bottom of the column. The microspheres are continuously removed, separated from the solvent, and are further dried before sintering.

The hot column solvent apparatus comprises a tall column with a conical bottom wherein the microspheres settle. The dehydrating solvent is introduced into the bottom of the column and is removed at the top thereof. The metal salt solution can be introduced into the top of the column to form solution droplets by several techniques. For example, a small tube or needle having an inner diameter within the range of from 0.15 to 0.6 millimeter can be used to introduce the suspension into the solvent to produce the preferred particles. Preferably the needle is surrounded by a larger capillary tube through which solvent is passed, and the suspension is introduced concurrently with this stream of solvent. As an alternate technique, the metal salt solution can be dispersed in a suitable solvent to form an emulsion containing droplets having uniform size, and the emulsion can be introduced into the column through an appropriate inlet. The dehydrated microspheres are removed from the conical collecting section at the bottom of the column.

In the hot column technique, the solvent can be reconditioned by circulation in a counter-current direction to a distillation pot for water removal. The distillation pot serves as a solvent reservoir for the system and can be controlled by adjusting the rate of water removal and distillation temperatures to provide a solvent having the desired water content. A water cooler can be placed on the solvent inlet line for adjustment of the solvent temperature to the desired value. This process has the advantage of providing a wide range of column conditions.

One embodiment of the equipment useful for the process comprises a column 70 inches in length and 3 inches in diameter with a conical bottom for collecting the settling microspheres. The solvent is pumped into the column 4 inches from the bottom and is removed from the column 4 inches from the top.

Choice of solvents for this system is very important. The solvents giving the best results are the higher alcohols which have the desired solubility for water. The solvents must be inert, free of objectionable physical properties such as emulsifying tendencies, for example, must have a density low enough to permit settling of the microspheres and must be capable of being heated to a temperature which is sufficiently high to cause decomposition of the ammonia-releasing agent to release ammonia in the aqueous droplets introduced into this system. The solvents selected must have saturation concentrations with water within a certain range permitting adjustment of drying conditions. Solubility for water of from about 1 to 30 percent has provided satisfactory results. Examples of preferred solvents include hexanol, ethyl-hexanol, and ethyl-butanol. Solvents with water solubilities which are too high may be recirculated from the distillation pot still retaining a predetermined amount of water whereby the effective water solubility is diminished. For example, butanol, which has a hot solubility for water of about 28 weight percent, is nearly saturated with water when introduced into the column. In contrast, ethyl-hexanol, which has a 4 to 6 weight percent hot solubility for water, is circulated to the column in nearly anhydrous form. Hexanol, with a 10 to 11 weight percent hot solubility for water, is used with a water content of 3 to 6 percent.

The temperature of the dehydrating solvent entering the column generally ranges from about 60 to 120° C. while that leaving from the top of the column is generally from about 10 to 40° C. cooler. Such temperatures are ideal for releasing ammonia within the aqueous droplets with most of the ammonia-releasing agents. Higher solvent temperatures may be employed with ammonia releasing agents such as urea.

The suspension droplets are dried to a final water content of less than 50 percent and preferably less than 25 percent in the column. The partially dehydrated product microspheres contain unreacted precipitating agent plus ammonium salts and other neutralization products. These must be removed prior to sintering. Therefore, the microspheres are treated with ammonia to fix the oxide components, then washed with water, and finally dried by heating in a stream of inert gas or in a vacuum. Preferably, the microspheres are gradually heated from 40° C. up to 110° C. during drying. The resulting microspheres are then ready for sintering.

Very important advances in the production of materials from which fuel elements for nuclear reactors can be fabricated are provided by the process of this invention. Previously, hexamethylenetetramine had been employed in an attempt to produce thorium oxide gels from thorium nitrate. These attempts were abandoned when it was determined that the gels produced reverted to sols on standing for several hours. In other previous work, hexamethylenetetramine had been mixed with preformed thorium oxide aquasols to form gel beads. This previous process is subject to a number of serious difficulties which are eliminated in the process of this invention. In the previous process, formation of an aquasol from which the beads could be formed as a preliminary step was necessary, a feature eliminated in the process of this invention. Furthermore, in the previous process, the gel beads produced were not dehydrated and were structurally weak, creating serious handling problems. Dehydration was obtained only after the beads were formed, removed, and placed in a separate apparatus. Finally, the previous process did not provide the uniform size and surface, and high density of the microspheres formed by the process of this invention.

The process of this invention is a simple, direct process. Because the hydrolysis rates increase with temperature, the ammonia-releasing agent may be dissolved in the salt solution at room temperature where the hydrolysis rate is quite slow and not cause precipitation. When metal salt solutions containing the precipitation agent are exposed to the higher temperatures of the dehydrating solvent, the rate of ammonia release is vastly accelerated and the hydrous oxide is precipitated within the droplet. The dehydrating solvent gradually extracts water from the precipitated droplets until substantially dry microspheres are obtained.

This invention is further illustrated by the following specific but non-limiting examples.

EXAMPLE I

This example describes the preparation of zirconia microspheres by the process of this invention.

A 41.9 g. quantity of hexamethylenetetramine crystals were dissolved with strong stirring in 300 ml. of zirconyl nitrate solution containing 15 g. of equivalent $ZrO_2$ per 100 ml. The pH of the solution following hexamethylenetetramine addition was 1.7. The above solution was formed into droplets by injecting it through a 23-gauge hypodermic needle surrounded by 2.8 mm. capillary tube through which a concurrent flow of hexanol was maintained at a temperature of 30° C. and a flow rate of 120 ml./min. The solution was injected at a rate of 2.8 ml./min. into the top of a 7 ft. column through which hexanol was pumped countercurrently at the rate of 760 ml./min. The temperature of the solvent was 100° C. entering the column at the bottom and 70° C. leaving the column at the top.

Perfect microspheres were recovered from the bottom of the column. They were smooth-surfaced and translucent to light. Their size ranged from 115 to 350 microns. The spheres were next soaked in concentrated ammonia for 15 min. to fix any water dispersible material and were then washed free of ammonium nitrate and unreacted hexamethylenetetramine.

EXAMPLE II

This example describes the preparation of yttrium oxide microspheres by the process of this invention.

A 200 ml. volume of yttrium chloride solution containing the equivalent of 11.2 g. $Y_2O_3$/100 ml. was treated with 31.4 g. of hexamethylenetetramine crystals. Following the addition, the solution pH was 6.4. The yttrium chloride-hexamethylenetetramine solution was introduced as droplets into a column of countercurrently flowing hexanol by the procedure described in Example I. The column conditions were as follows:

| | |
|---|---|
| Feed injection rate, ml./min. | 1.7 |
| Solvent flow rate, ml./min.: | |
|     To needle | 85 |
|     To column | 690 |
| Solvent temperature, ° C.: | |
|     To needle | 28 |
|     To column | 111 |
|     From column | 75 |
|     In distillation pot | 126 |

The recovered microspheres were translucent and averaged 140 microns in size. They were soaked in concentrated ammonia for 15 minutes, and then washed with water.

EXAMPLE III

This example describes the improvement in the yield of product microspheres obtained by adding urea in addition to hexamethylenetetramine to an yttrium chloride solution.

A 75 ml. quantity of a solution containing a total of 20.9 g. hexamethylenetetramine and 75 ml. of a solution containing 26.9 g. urea was added with strong stirring to 150 ml. of the yttrium chloride solution employed in Example II. The pH of the system after mixing was 6.6. The solution mixture was then injected into the column by the procedure and conditions described in Example II.

The product microspheres from this experiment were more rigid, and a higher yield was obtained than in Example II. They were similar in shape, size, smoothness, and transparency.

EXAMPLE IV

This example describes the preparation of uranium trioxide microspheres by the process of this invention.

A 100 ml. volume of solution containing a total of 26.5 g. of hexamethylenetetramine was added with rapid stirring to a 200 ml. volume of uranyl chloride solution containing the equivalent of 22.5 g. $UO_2$/100 ml. The pH of the solution following this addition was 3.8. The equivalent $UO_2$ concentration was 15 g./100 ml. The above solution was then injected into the column described in Example I. The conditions were as follows:

| | |
|---|---|
| Feed injection rate, ml./min. | 2.3 |
| Solvent flow rate, ml./min.: | |
|     To needle | 85 |
|     To column | 690 |
| Solvent temperature, ° C.: | |
|     To needle | 28 |
|     To column | 100 |
|     From column | 74 |
|     In distillation pot | 109 |

Smooth yellow spheres ranging in size from 150 to 290 microns were recovered from the bottom of the column. These were soaked for 15 min. in concentrated ammonia, and then washed free of electrolytes with deionized water.

EXAMPLE V

This example describes the preparation of uranium dioxide microspheres.

A 22.2 g. quantity of hexamethylenetetramine dissolved in 45 ml. of water was added with rapid stirring to a 300 ml. volume of uranous chloride solution containing the equivalent of 9.48 g. $UO_2$/100 ml. The uranous chloride was obtained by electrolytic reduction of uranyl chloride solution in the presence of excess hydrochloric acid. The pH of the solution was 0.80. The solution was then injected into the column as described in Example I. The conditions were as follows:

| | |
|---|---|
| Feed injection rate, ml./min. | 1.4 |
| Solvent flow rate, ml./min.: | |
|     To needle | 165 |
|     To column | 690 |
| Solvent temperature, ° C.: | |
|     To needle | 33 |
|     To column | 100 |
|     From column | 70 |
|     In distillation pot | 109 |

The product recovered from the bottom of the column consisted of perfect black spheres with slightly roughened surfaces. The particle size ranged from 140 to 350 microns. The microspheres were treated with concentrated ammonia solution for 15 min., and then washed with deionized water until free of electrolytes.

EXAMPLE VI

This example describes the preparation of thorium dioxide microspheres by the process of this invention.

A 107 ml. quantity of an aqueous solution containing 52.4 g. of hexamethylenetetramine and 118 ml. of an aqueous solution containing 480 g. of urea was added with strong stirring to 90 g. of thorium nitrate dissolved in 95 ml. of water. Then 75 ml. additional water were added to the mixed solutions. The pH of the final solution was 4.5. The solution was then injected into the column as described in Example I. The conditions were as follows:

| | |
|---|---|
| Feed injection rate, ml./min. | 1.2 |
| Solvent flow rate, ml./min.: | |
|     To needle | 118 |
|     To column | 760 |
| Solvent temperature, ° C.: | |
|     To needle | 33 |
|     To column | 102 |
|     From column | 76 |
|     In distillation pot | 112 |

White microspheres of thorium dioxide, ranging in size from 170 to 290 microns, were recovered from the bottom of the column. These were soaked for 15 min. in concentrated ammonia solution, and then washed with water until free of electrolytes.

EXAMPLE VII

This example describes the preparation of uranium dioxide-yttrium oxide microspheres by the process of this invention.

The starting solution was prepared to yield the uranium and yttrium in equimolar proportion. A 150 ml. volume of an aqueous uranous chloride solution containing the equivalent of 9.48 g. $UO_2$/100 ml. was mixed with 31.4 ml. of an yttrium chloride solution containing the equivalent of 20 g. $Y_2O_3$/100 ml. The mixed solution was then mixed with 50 ml. of an aqueous solution containing 20.5 g. of hexamethylenetetramine. The pH of the final solution was 1.4.

The solution was injected into the column described in Example I. The conditions were as follows:

Feed injection rate, ml./min. -------- 2.4
Solvent flow rate, ml./min.:
    To needle -------------------- 120
    To column -------------------- 690
Solvent temperature, °C.:
    To needle -------------------- 31
    To column -------------------- 115
    From column ------------------ 75
    In distillation pot ---------- 126

The black microspheres produced ranged in size from 160 to 310 microns. These microspheres were treated with a concentrated ammonia solution for 15 min., and then washed with water.

EXAMPLE VIII

This example describes the preparation of uranium dioxide-zirconium dioxide microspheres.

The starting solution was prepared to yield the uranium and zirconium in equimolar proportions. A 300 ml. volume of uranous chloride solution containing the equivalent of 10 g. $UO_2$/100 ml. was mixed with a 68.3 ml. volume of zirconyl chloride solution containing the equivalent of 20 g. $ZrO_2$/100 ml. An aqueous solution containing 35.9 g. of hexamethylenetetramine was added with strong stirring to this solution. The pH of the final solution prior to injection was 0.9. The solution was then injected into the column as described in Example I. The conditions were as follows:

Feed injection rate, ml./min. -------- 1.1
Solvent flow rate, ml./min.:
    To needle -------------------- 150
    To column -------------------- 710
Solvent temperature, °C.:
    To needle -------------------- 38
    To column -------------------- 100
    From column ------------------ 71
    In distillation -------------- 109

The product microspheres were black in color and ranged in size from 100 to 250 microns. Some were perfectly smooth while others displayed slightly roughened surfaces. The microspheres were treated with ammonia and with water as described in Example VIII.

EXAMPLE IX

This example describes the preparation of uranium dioxide-carbon microspheres which may be converted to uranium dicarbide spheres by sintering in hydrogen or inert gas atmospheres.

The starting solution was prepared by mixing 45 ml. of an aqueous solution containing 23.4 g. of hexamethylenetetramine with 300 ml. of an aqueous uranous chloride solution containing the equivalent of 10 g. $UO_2$/100 ml. A 5.34 g. sample of Mogul carbon black was dispersed in the solution with an ultransonic probe operating at a frequency of 20,000 c.p.s. The carbon was obtained from the Cabot Corporation and comprises particles averaging 30 m$\mu$ in diameter. The pH of the final mixture was 1.2. The mixture was then injected into the column described in Example I. The conditions were as follows:

Feed injection rate, ml./min. -------- 0.7
Solvent flow rate, ml./min.:
    To needle -------------------- 118
    To column -------------------- 690
Solvent temperature, °C.:
    To needle -------------------- 31
    To column -------------------- 99
    From column ------------------ 70
    In distillation pot ---------- 109

The product microspheres were dull black in color, with slightly roughened surfaces. Sphericity was excellent. The size ranged from 125 to 220 microns. To insure fixation of all the uranium, the microspheres were treated with concentrated ammonia solution for 15 min. This was followed with a water wash to remove electrolytes.

EXAMPLE X

This example describes the preparation of thorium dioxide plus carbon microspheres which may be converted to thorium dicarbide microspheres by sintering as described in Example IX.

The starting solution was prepared by mixing 36.7 g. of hexamethylenetetramine dissolved in 75 ml. of water with 225 ml. of an aqueous thorium nitrate solution containing the equivalent of 20 g. $THO_2$/100 ml. An 8.16 g. quantity of Mogul carbon was dispersed in the solution with an ultrasonic probe operating at 20,000 c.p.s. The pH of the resulting mixture was 3.0. The mixture was injected into the column described in Example I. The conditions were as follows:

Feed injection rate, ml./min. -------- 0.2
Solvent flow rate, ml./min.:
    To needle -------------------- 135
    To column -------------------- 880
Solvent temperature, °C.:
    To needle -------------------- 40
    To column -------------------- 121
    From column ------------------ 75
    In distillation pot ---------- 135

Black spheres with slightly rough surfaces were recovered from the bottom of the column. The size ranged from 140 to 230 microns. The spheres were then treated with ammonia and with water as described in Example IX.

Obviously, many modifications and variations of the process of this invention as herein set forth may be made without departing from the essence thereof, and only such limitations should be applied as are indicated in the claims.

I claim:

1. A process for forming microspheres from metal oxides comprising the steps of
    (a) mixing an ammonia-releasing agent with an aqueous solution containing from about 1 g./l., expressed as the metal oxide, up to saturation quantities of salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof, and containing from 0 to 5 moles of colloidal carbon per mole of metal, the quantity of ammonia-releasing agent mixed with the solution being sufficient to provide at least 70% of the stoichiometric quantity of ammonia required to react with the salts in the solution;
    (b) introducing the mixture in the form of droplets in a dehydrating solvent having a temperature sufficiently high to cause substantial decomposition of the ammonia-releasing agent, and
    (c) recovering dehydrated microspheres from the dehydrating solvent.

2. A process of claim 1 wherein the ammonia-releasing agent is selected from the group consisting of hexamethylenetetramine, acetamide, ammonium carbamate, ammonium cyanate, urea, and mixtures thereof.

3. A process of claim 1 wherein the ammonia-releasing agent is mixed with the solution in a quantity sufficient to provide from about 70 to 300% of the stoichiometric quantity of ammonia required to react with the salts in the solution.

4. The process of claim 1 wherein the droplets are allowed to remain in contact with the dehydrating solvent until the droplet water content is 50 wt. percent of the solid constituents in the droplet.

5. The process of claim 1 wherein the dehydrating solvent has a solubility for water within the range of from 1 to 30 wt. percent.

References Cited by the Examiner

UNITED STATES PATENTS

| | | | |
|---|---|---|---|
| 2,467,089 | 4/1949 | Marisic et al. | 252—317 X |
| 2,492,167 | 12/1949 | Marisic et al. | 252—317 X |
| 2,900,349 | 8/1959 | Schwartz | 252—317 |
| 3,027,234 | 3/1962 | Michalko | 252—317 X |
| 3,171,715 | 3/1965 | Kleinsteuber. | |

FOREIGN PATENTS 904,679  8/1962  Great Britain.

CARL D. QUARFORTH, *Primary Examiner.*

BENJAMIN R. PADGETT, *Examiner.*

S. TRAUB, *Assistant Examiner.*